United States Patent [19]

Terasaki

[11] Patent Number: 5,461,883
[45] Date of Patent: Oct. 31, 1995

[54] COMPRESSION REFRIGERATING MACHINE

[75] Inventor: Masatoshi Terasaki, Tsuchiura, Japan

[73] Assignee: Hitachi, Ltd., Tokyo, Japan

[21] Appl. No.: 186,476

[22] Filed: Jan. 26, 1994

[30] Foreign Application Priority Data

Jan. 26, 1993 [JP] Japan .................... 5-010472

[51] Int. Cl.$^6$ .................................... F25B 43/02
[52] U.S. Cl. .................. 62/469; 62/471; 62/474; 62/129
[58] Field of Search ................... 62/84, 85, 114, 62/192, 193, 195, 468, 469, 470, 471, 472, 474, 475, 502, 125, 126, 127, 129, 473

[56] References Cited

U.S. PATENT DOCUMENTS

| | | | |
|---|---|---|---|
| 1,883,899 | 10/1932 | Harris | 62/84 X |
| 2,325,657 | 8/1943 | Burkness | 62/474 X |
| 2,749,723 | 6/1956 | Webber | 62/474 X |
| 3,004,396 | 10/1961 | Endress et al. | 62/84 |
| 3,874,192 | 4/1975 | Kato | 62/468 X |
| 3,978,685 | 9/1976 | Taylor | 62/84 X |
| 4,266,408 | 5/1981 | Krause | 62/474 |
| 4,558,573 | 12/1985 | La Monica | 62/84 X |
| 4,671,081 | 6/1987 | Fujiwara et al. | 62/84 X |
| 4,908,132 | 3/1990 | Koval et al. | 62/474 X |
| 5,165,248 | 11/1992 | Sishtla | 62/468 X |

FOREIGN PATENT DOCUMENTS

4-183788  6/1992  Japan .

*Primary Examiner*—Harry B. Tanner
*Attorney, Agent, or Firm*—Antonelli, Terry, Stout & Kraus

[57] ABSTRACT

A compression refrigerating machine for enabling an alternative refrigerant to be used by removing water content or chlorine which may be mixed into a lubricating oil. The compression refrigerating machine includes a vaporizer, a condenser, a compressor for compressing a refrigerant gas from the vaporizer, a drive source for driving the compressor, a lubricating oil line in which a lubricating oil is circulated and a refrigerant line in which a refrigerant is circulated. The lubricating oil line provides with a device for removing water content or for removing chlorine.

13 Claims, 4 Drawing Sheets

5,461,883

COMPRESSION REFRIGERATING MACHINE

BACKGROUND OF THE INVENTION

1. Field of the Invention

This invention relates to a compression refrigerating machine utilizing a refrigerant not containing a Cl radical.

2. Description of the Prior Art

In a compression refrigerating machine that utilizes a refrigerant such as CFC11, CFC12, HCFC123, HCFC22 or the like containing a Cl radical, even if a mineral oil (e.g a turbine oil) used as a lubricating oil for a compressor is released to the atmosphere, the moisture absorptivity of water content is minimal, so that it has been unnecessary to provide with means for removing water content particularly in the oil. However, a so-called alternative refrigerant that replaces the above-mentioned refrigerant and does not contain a Cl radical, for example, HFC134a (1,1,1,2 tetrafluoroethane), is not dissolvable with a mineral oil and, because of their two-phase separation, the mineral oil cannot be used in a compression refrigerating machine. Accordingly, it becomes indispensable to use a synthetic oil (e.g. an ester oil) newly designed molecularly to acquire a mutual solubility.

Nonetheless, the above-mentioned synthetic oil has a nature tending to absorb moisture or water content and, when admixed with a large amount of water, is hydrolyzed and hence fails to function as a lubricating oil. Moreover, the synthetic oil is unstable with respect to a chloride and, when admixed with a large amount of chlorine content, is hydrolyzed and hence again fails to function as a lubricating oil. Furthermore, water content is generally admixed with a lubricating oil when water, used prior to an operation of the compression refrigerating machine during an airtight test, is not completely removed and remains in the compression refrigerating machine. And when a synthetic oil is used, there is a tendency that this water residue is easily mixable patentably with a synthetic oil.

Also, when a compression refrigerating machine, at the time of its assembly, is washed with a chlorine containing detergent and, if the detergent is not completely removed after the washing step, a synthetic oil is generally unstable with respect to a chloride and, when mixed with chlorine, is hydrolyzed and the water is increasingly deteriorated resulting in significantly reducing the function of the lubricating oil.

SUMMARY OF THE INVENTION

It is an object of the present invention to provide a compression refrigerating machine which enables an alternative refrigerant to be used by removing water content or chlorine that may be admixed with a synthetic oil.

The present invention provides a compression refrigerating machine that comprises a vaporizer, a condenser, a compressor for compressing a refrigerant gas from the vaporizer, a drive motor for driving the compressor and an oil line in which a lubricating oil is circulated, wherein a device for removing water content is provided in the oil line.

The device used for removing water content is constructed of a material which selectively absorbs water content and, when the lubricating oil passes through the water content removing device, only the water content in the lubricating oil is selectively trapped to achieve a removal of water content in the lubricating oil.

Also, the present invention provides a compression refrigerating machine comprising an evaporator, a condenser, a compressor for compressing a refrigerant gas from the vaporizer, a drive motor for driving the compressor and an oil line in which a lubricating oil is circulated, wherein a device for removing chlorine is provided in the oil line.

The device used to remove chlorine is constructed of a material which selectively absorbs chlorine and, when the lubricating oil passes through the chlorine removal device, chlorine in the lubricating oil is selectively trapped to achieve a removal of chlorine in the lubricating oil.

DESCRIPTION OF PREFERRED EMBODIMENTS

Figure 1:
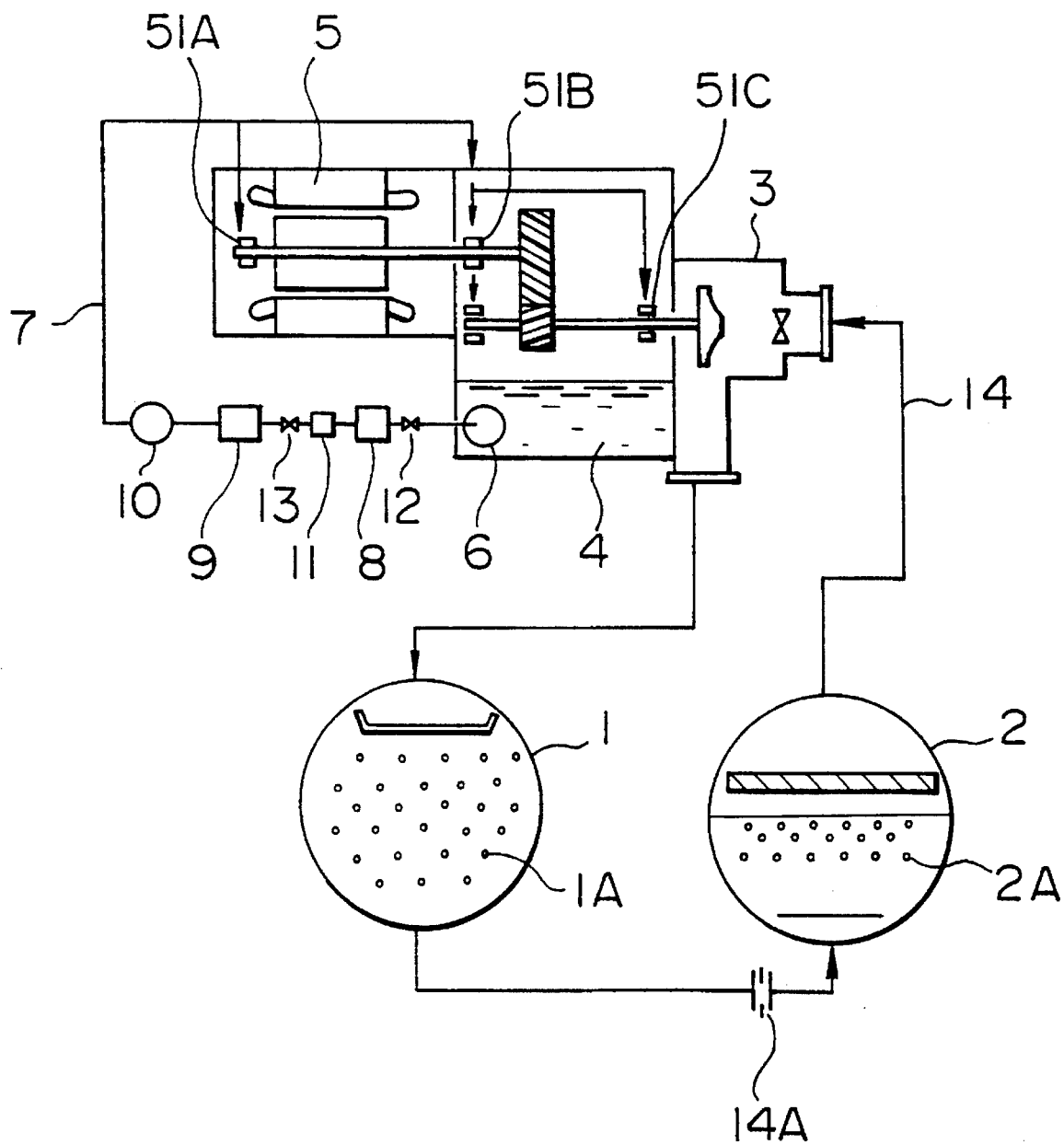
FIG. 1 is a schematic diagram of an embodiment of the compression refrigerating machine according to the present invention.
Figure 2:
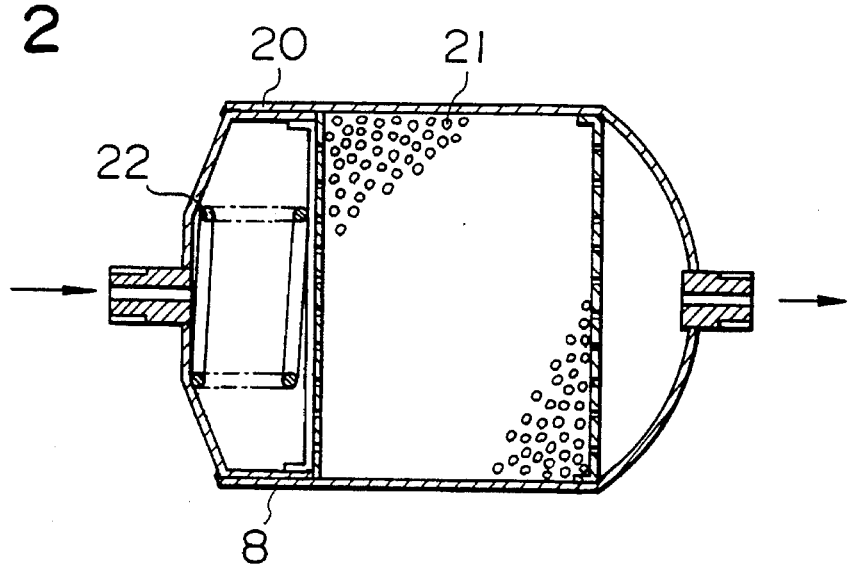
FIG. 2 is a detail view of a water content removing device used in a compression refrigerating machine of FIG. 1 in accordance with the present invention.

Referring to FIGS. 1 and 2, a turbo refrigerating machine illustrated includes a condenser 1, a vaporizer 2, a compressor, for example, a turbo compressor 3 and a drive source 5 for driving the compressor 3. The condenser 1 incorporates heat-transfer tubes 1A for introducing a cooling water from outside the machine to cool a high-temperature and high-pressure refrigerant gas; whereas, the evaporator 2 incorporates heat-transfer tubes for removing cooled water toward the outside thereof. The condenser 1, the vaporizer 2 and the compressor 3 are connected to each other in a refrigerant line 14 and an expansion valve 14A between the condenser 1 and the vaporizer 2. An oil tank 4 is provided in a lower portion of the compressor 3 for reserving a lubricating oil, with an oil pump 6 being provided in the lower portion of the oil tank 4 for circulating the lubricant oil. A lubricant oil line 7 is provided between the oil pump 6 and the compressor 3 and the drive source 5 so as to circulate the lubricanting oil through bearing portions 51A, 51B and 51C. The lubricant oil line 7 includes a water content removal device 8 and also a water content detector 9, an oil cooler 10, an oil strainer 11 and divider valves 12 and 13.

As shown in FIG. 2 the water content removal device 8 includes a container 20 packed with a drying agent 21. The drying agent has pores which are smaller than a molecular size of the refrigerant and may, for example, be fashioned as a molecular sieve functions to adsorb water content. A spring 22 secures the drying agent 21 in position within the container 20.

A refrigerant, which is a so-called alternative refrigerant excluding the Cl, in all of the embodiments of the invention is used and, for example may be HFC134a. Also, as to the lubricanting oil, a synthetic oil is used such as, for example, an ester oil.

In the turbo refrigerating machine of FIGS. 1 and 2, the refrigerant gas of a high temperature and a high pressure, compressed by the compressor 3, is introduced into the condenser 1 and cooled by the cooling water flowing through the heat-transfer tubes 1A so as to liquefy, thereby becoming a liquid refrigerant. The low-temperature refrigerant gas from the condenser 1, high-pressure liquid refrigerant, when passed through the expansion valve 14A is further reduced in temperature to become a low-temperature, low-pressure liquid refrigerant which is stored in the vaporizer 2. In the vaporizer 2, the liquid refrigerant is vaporized to change into a refrigerant gas by virtue of the cooling water returned at an increased temperature by heat-exchanging with the air as an exterior air-conditioning load, is heat-exchanged with the liquid refrigerant at the heat-exchanger tube 2A. The refrigerant gas, compressed by the compressor 3 to once again become again the refrigerant gas of high temperature and high pressure, is introduced into the condenser 1 where it is cooled by the cooling water flowing through the heat-transfer tubes 1A to become the liquid refrigerant. This cycle is repeated. When the oil pump 6 is operated, the lubricanting oil is passed through the water content removal device 8, the water content detector 9, the oil cooler 10 and the oil strainer 11. Only the water content of the lubricanting oil is adsorbed when the lubricating oil passes through the water content removal device 8, thereby removing the water content contained in the lubricating oil. It will be understood that water can be removed also by operating only the oil pump 6 without operating the refrigerating machine. For the water content detector 9 an indicator may be used whose color changes depending upon the amount of water content and, in this manner, enables a determination of the time of exchanging the water content removal device. Alternatively, an alarm may be used so as to indicate the timing of exchange. The oil cooler 10 cools the lubricating oil, thereby preventing a temperature increase. Also, the oil strainer 11 is capable of removing a granular matter that may be incorporated in the oil. Further, since the water content removal by the water content removal device 8 is effected when stop valves 12 and 13 are closed, there is no need to recover the refrigerant in the refrigerating machine for water content removal.

Figure 3:
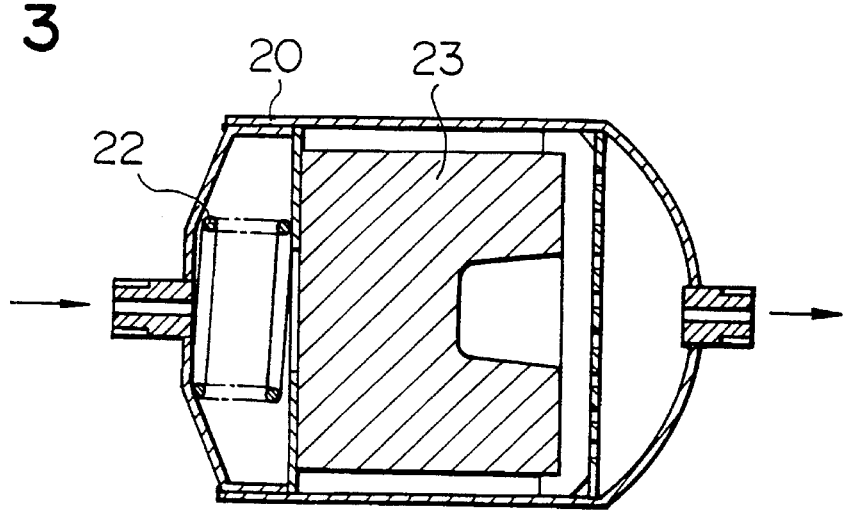
FIG. 3 is a detail view of anther embodiment of water content removing device according to the present invention.

FIG. 3 illustrates an apparatus which functions to remove water content and any granular matter, with a solidified drying agent for removing water content serving as a strainer 23 disposed in the container 20.

In place of the water content removal device, a chlorine removal device which is constructed, for example, by packing a charcoal filter in a container, may be arranged in the same position as the water content removal device to achieve a removal of chlorine in the lubricating oil.

Figure 4:
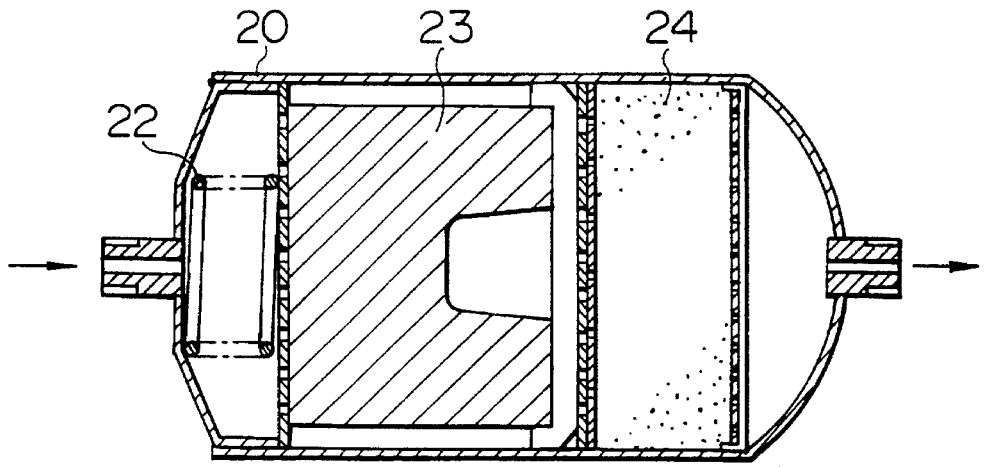
FIG. 4 is a detail view of an embodiment of water content removing device and chlorine removing device according to the present invention.

FIG. 4 illustrate a further embodiment of the present invention in which a strainer 23 serving as a dryer and a charcoal filter unit 24 are connected in series to each other in a container 20. The strainer 23 and charcoal filter unit 24 may be arranged in the same position as the water content removal device 8 so that they may not only serve to remove water content contained in the lubricanting oil but also remove chlorine.

Figure 5:
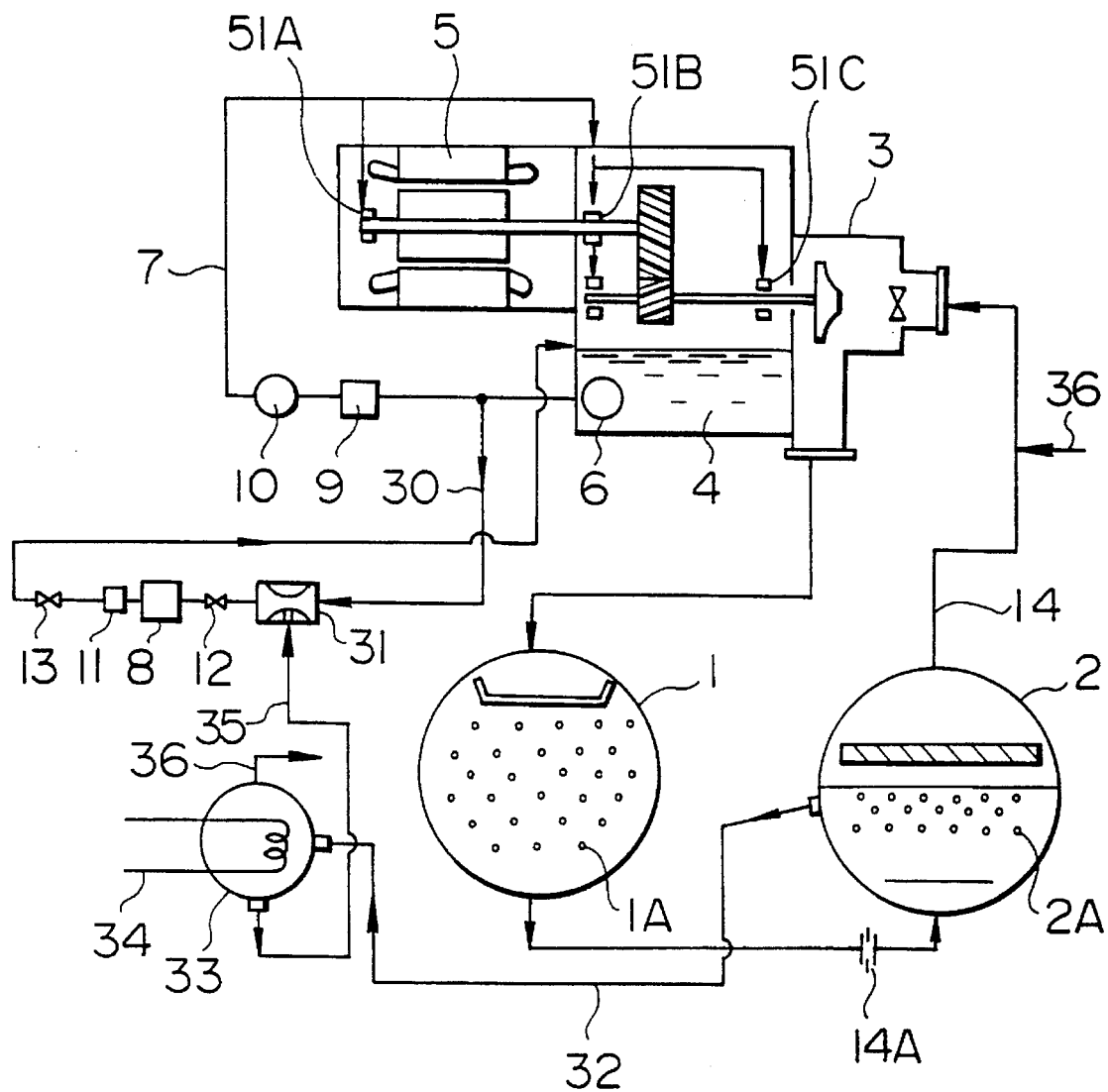
FIG. 5 is a schematic diagram of another embodiment of the compression refrigerating machine in accordance with the present invention.

FIG. 5 illustrates another embodiment of the present invention which is essentially a compression refrigerating machine capable of performing an automatic oil recovery function.

In the embodiment of FIG. 5, the lubricating oil line 7 has a bifurcate line 30 through which the lubricating oil is returned to the oil tank 4. An ejector 31 is disposed in the bifurcate line 30 and a refrigerant line 32 as provided below a refrigerant surface of the evaporator 2 and in a vicinity thereof for connection to an oil recoverer 33. A heater 34 is provided to heat the refrigerant liquid in the oil recoverer 33. A recovery oil line 35 is provided at the bottom of the oil recoverer 33 and is connected to the ejector 31. A refrigerant line 36 is provided on the upper portion of the oil recoverer 33 for recovering the refrigerant, with the refrigerant line 36 being connected to the refrigerant line 14 between the evaporator 2 and the compressor 3.

In the turbo refrigerating machine of FIG. 5, in the vicinity of a refrigerant surface of the evaporator 2, a lubricating oil content, leaked from the compressor 3, is dissolved into the refrigerant. As a result, the lubricating oil content in the refrigerant there is relatively large as compared with that at the bottom region of the evaporator 2. The refrigerant liquid is taken from this region into the oil recoverer 33 via the refrigerant line 32. In the oil recoverer 33, with the refrigerant gas from the condenser 1 passing through the conduit 34, the concentration of the lubricanting oil content is enhanced because the refrigerant liquid in the oil recoverer 33 is heated by the heat in the conduit 34. The water content mixed with the lubricating oil is drawn up from the oil recoverer 33 due to a negative pressure generated at the ejector 31 together with the lubricating oil in the oil recoverer 33. The water content together with the lubricating oil is returned to the oil tank 4 via the water content removal device 8 and the water content detector 9. The oil content removal device may be arranged between the oil strainer 11 and the ejector 31, between the oil pump 6 and the ejector 31 or between the ejector 31 and the oil recoverer 33.

According to the embodiment of FIG. 5, it is possible to remove water content not only from the lubricating oil line but from the refrigerant line 32.

Figure 6:
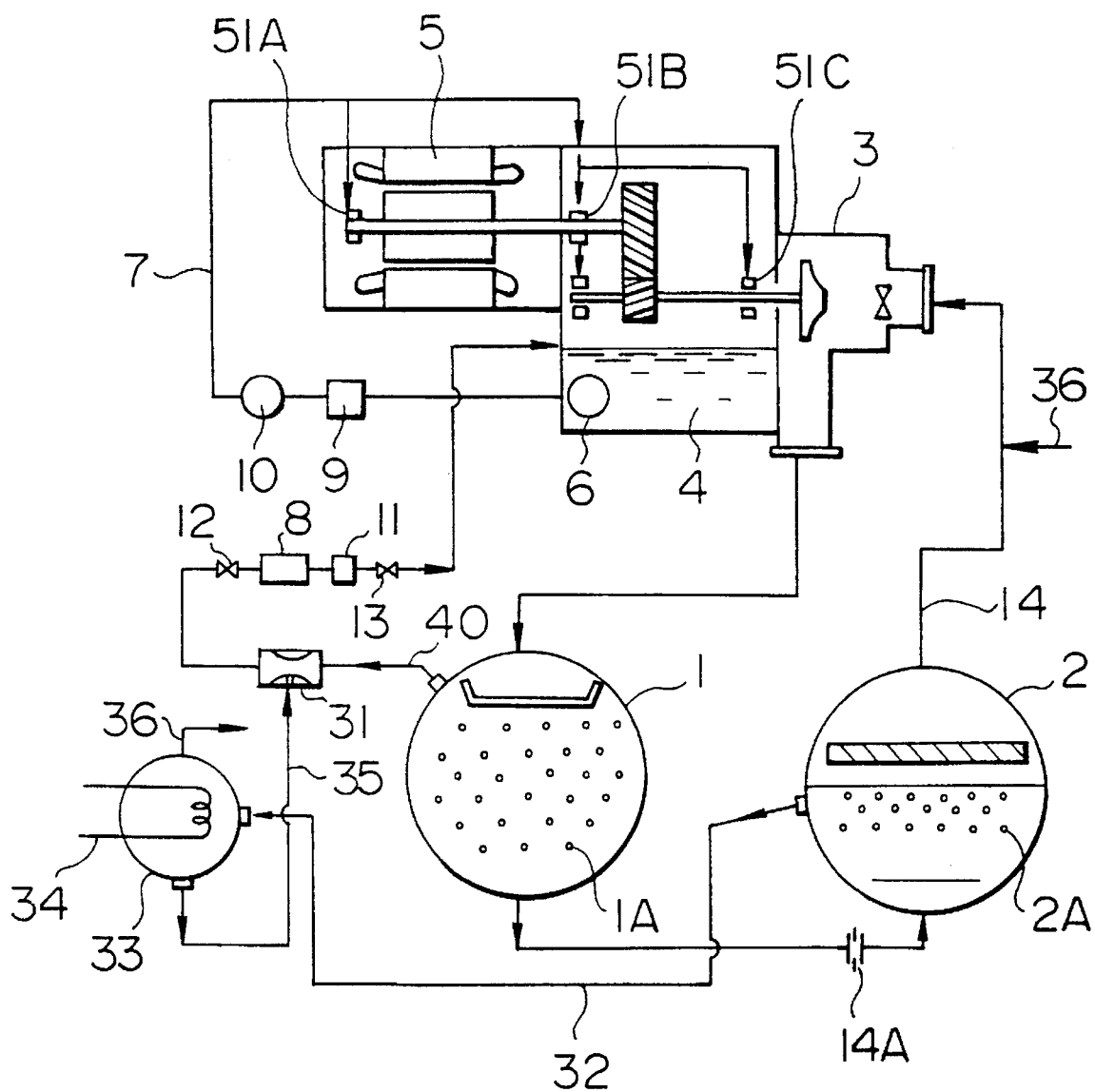
FIG. 6 is a schematic diagram of a further embodiment of the compression refrigerating machine in accordance with the present invention.

FIG. 6 illustrates still a further embodiment of a turbo refrigerating machine of the present invention which utilizes a differential pressure between the condenser 1 and the oil tank 4 to remove water content from the recovered oil and a refrigerant line. A gas refrigerant line 40 is connected between the condenser 1 and the oil tank 4 and has arranged therein an ejector 31 to which an oil recovery line 35 is connected from an oil recoverer 33.

In order to draw up the oil 33 from oil recoverer 33, a flow of the refrigerant gas that is generated by a differential pressure between the condenser 1 and the oil tank 4 is utilized to generate a necessary negative pressure in the ejector 31. The water content of the recovered oil and the refrigerant gas is effectively removed by passing through the water content removal device 8 with the recovered oil, recovered by the oil recoverer 33, being drawn up together with the refrigerant gas from the ejector 31.

What is claimed is:

1. A compression refrigerating machine comprising a vaporizer, a condenser, a compressor for compressing a refrigerant gas from the vaporizer, a driver motor for driving said compressor, a lubricating oil line in which a lubricating oil is circulated, and a refrigerant line in which a refrigerant is circulated, wherein the lubricating oil line includes means for removing water content.

2. A compression refrigerating machine as set forth in claim 1, wherein the lubricating oil line includes means for detecting the water content.

3. A compression refrigerating machine comprising a vaporizer, a condenser, a compressor for compressing a refrigerant gas from the vaporizer, a driver motor for driving said compressor, a circulating oil line in which a lubricating oil is circulated, and a refrigerant line in which a refrigerant is circulated, wherein the circulating oil line includes means for removing chlorine.

4. A compression refrigerating machine comprising a vaporizer, a condenser, a compressor for compressing a refrigerant gas from the vaporizer, a drive motor for driving said compressor, a lubricating oil line in which a lubricating oil is circulated, and a refrigerant line in which a refrigerant is circulated, wherein the lubricating oil line includes means for removing water content from the lubricating oil and means for removing chlorine.

5. A compression refrigerating machine including a vaporizer, a condenser, a compressor for compressing a refrigerant gas from the vaporizer, a drive motor for driving said compressor, a lubricating oil line in which a lubricating oil is circulated, and a refrigerant line in which a refrigerant is circulated, the compression refrigerating machine comprising an oil recoverer in the refrigerant line for recovering the lubricating oil mixed with the refrigerant into an oil tank, a recovery oil line for recovering the oil in said oil recoverer and connected to an ejector arranged in the lubricating oil line for returning recovered oil into said oil tank, and means for removing a water content in the lubricating oil line in which said ejector is arranged.

6. A compression refrigerating machine including a vaporizer, a condenser, a compressor for compressing a refrigerant gas from the vaporizer, a drive motor for driving said compressor, a lubricating oil line in which a lubricating oil is circulated, and a refrigerant line in which a refrigerant is circulated, the compression refrigerating machine comprising an oil recoverer provided in the refrigerant line for recovering the lubricating oil mixed with the refrigerant into an oil tank; an oil recovery line for recovering the oil by said oil recoverer and connected to an ejector arranged in the lubricating oil line for returning recovered oil in said oil tank; and means for removing chlorine in the lubricating oil line in which said ejector is arranged.

7. A compression refrigerating machine including a vaporizer, a condenser, a compressor for compressing a refrigerant gas from the vaporizer, a drive motor for driving said compressor, a lubricating oil line in which a lubricating oil is circulated, and a refrigerant line in which a refrigerant is circulated, the compression refrigerating machine comprising an oil recoverer provided in said refrigerant line for recovering the lubricating oil mixed with the refrigerant into an oil tank; an oil recovery line for recovering oil recovered by said oil recoverer and connected to an ejector arranged in the lubricating oil line for returning recovered oil into said oil tank; and means for removing a water content and an apparatus for removing chlorine in the lubricating oil line in which said ejector is arranged.

8. A compression refrigerating machine including a vaporizer, a condenser, a compressor for compressing a refrigerant gas from the vaporizer, a drive motor for driving said compressor, a lubricating oil line in which a lubricating oil is circulated, and a refrigerant line in which a refrigerant gas is circulated, the compression refrigerating machine comprising: an oil recoverer provided in said refrigerant line for recovering the lubricating oil mixed with the refrigerant into an oil tank; an ejector provided in a refrigerant system where said condenser and said oil tank are connected together to provide a pressure difference therebetween; said ejector being connected to a recovery oil line for the oil recovered by said oil recoverer for returning the oil to said oil tank; and means for removing water content and provided in said refrigerant gas line.

9. A compression refrigerating machine including a vaporizer, a condenser, a compressor for compressing a refrigerant gas from the vaporizer, a drive motor for driving said compressor, a lubricating oil line in which a lubricating oil is circulated, and a refrigerant line in which a refrigerant is circulated, the compression refrigerating machine comprising an oil recoverer provided in said lubricant line for recovering the lubricating oil mixed with the lubricant into an oil tank; an ejector provided in a refrigerant gas system where said condenser and said oil tank are connected together to provide a pressure difference therebetween; said ejector being connected to a recovery oil line for oil recovered by said oil recoverer for returning recovered oil into the oil tank; and means for removing water and chlorine and provided in said lubricant line.

10. A compression refrigerating machine including a vaporizer, a condenser, a compressor for compressing a refrigerant gas from the vaporizer, a driver motor for driving said compressor, a lubricating oil line in which a lubricating oil is circulated, and a refrigerant line in which a refrigerant is circulated, the compression refrigerating machine comprising an oil recoverer provided in said refrigerant line for recovering oil mixed with the refrigerant and for returning recovered oil into an oil tank; an ejector provided in a refrigerant gas system where said condenser and said oil tank are connected together to provide a pressure difference; said ejector being connected to a recovery oil line for the oil recovered by said oil recoverer for returning recovered oil to said oil tank; and means for removing water content and for removing chlorine provided in said refrigerant gas line.

11. A compression refrigerating machine as set forth in claim 8, wherein the refrigerant line is provided between a refrigerant liquid surface of the evaporator and the oil recoverer.

12. A compression refrigerating machine as set forth in claim 9, wherein the refrigerating line is provided between a refrigerant liquid surface of the evaporator and the oil recoverer.

13. A compression refrigerating machine including a vaporizer, a condenser, a compressor for compressing a refrigerant gas from the vaporizer, a drive motor for driving said compressor, a lubricating oil line in which a lubricating oil is circulated, and a refrigerant line in which a refrigerant is circulated, the compression refrigerating machine comprising a 1,1,1,2 tetrafluoroethane used as a refrigerant, a synthetic oil used as a lubricating oil; and means for removing water content provided in the lubricating oil line.

* * * * *